United States Patent [19]

Grisch

[11] 4,302,499
[45] Nov. 24, 1981

[54] MOLDABLE COMPOSITE

[75] Inventor: William E. Grisch, Elburn, Ill.

[73] Assignee: Armco Inc., Middletown, Ohio

[21] Appl. No.: 107,353

[22] Filed: Dec. 26, 1979

Related U.S. Application Data

[63] Continuation-in-part of Ser. No. 911,491, Jun. 1, 1978, Pat. No. 4,207,282.

[51] Int. Cl.$^3$ ............................................. B32B 5/02
[52] U.S. Cl. ................................. 428/236; 428/430; 428/238; 428/252; 428/285; 428/287; 428/288; 428/293; 428/294
[58] Field of Search ............... 428/236, 430, 285, 287, 428/288, 293, 294, 238; 52/20

[56] References Cited

U.S. PATENT DOCUMENTS

| | | | |
|---|---|---|---|
| 2,836,529 | 5/1958 | Morris | 428/236 |
| 3,257,266 | 7/1966 | Sapper | 156/333 |
| 3,784,664 | 1/1964 | Nicklin | 264/246 |

OTHER PUBLICATIONS

Lubin, G., ed, Handbook of Fiberglass and Advanced Plastics Composites, Van Nostrand Reinhold Co., N.Y., 1969, pp.37–40.

Naitore, M. H., Asso. Ed. Plastics Technology, Mar. 1976, p. 41.

Primary Examiner—George F. Lesmes
Assistant Examiner—E. Rollins Buffalow
Attorney, Agent, or Firm—Roylance, Abrams, Berdo & Farley

[57] ABSTRACT

The formation of a composite formed by spreading a liquid thermosetting resin over a continuously moving plastic film or sheet. Chopped fiber is added and a fabric or veil, such as dacron polyester cloth, is continuously laid over the top to form a reinforced composite. This continuously produced thermosetting resin composite is rolled into a coil. After a maturation period, the plastic film or sheet may be removed from the SMC composite and sections of appropriate size and weight are cut from the coil and placed over the die of a compression molding machine, veil side down, up or both. The material is then compression molded at a pressure of 500-3000 p.s.i. (35 to 210 kg. per sq. cm.) and a temperature of 100°-165° C., and cured into an article. The fabric used has a grab break strength of at least 10 lbs. (4.5 kg.) in both longitudinal and transverse directions, and a tensile elongation of at least 10%, and is sufficiently permeable to permit liquid resin to pass therethrough during compression molding.

5 Claims, 10 Drawing Figures

4,302,499

MOLDABLE COMPOSITE

CROSS-REFERENCE TO RELATED APPLICATIONS

This application is a continuation-in-part of application Ser. No. 911,491, filed June 1, 1978, now U.S. Pat. No. 4,207,282.

BACKGROUND OF THE INVENTION

1. Field of the Invention

This invention relates to the production of plastic articles which have the properties of high flexural and impact strength as well as good corrosion resistance.

2. Description of the Prior Art

Because of their comparatively low cost and high strength, fiber reinforced plastics are finding an ever expanding use in the construction of many articles, such as manhole segments, storage tanks, water control gates, weir plates, scum baffles, shower stalls, transportation components, boat hulls, and chairs just to name a few. A serious deficiency of such materials, however, is their poor resistance to corrosion, weathering and abrasion. Conventional methods used for molding fiber reinforced plastics result in the reinforcing fiber being near the outer surface and only covered by a thin layer of resin. This resin layer may be worn away in the course of normal use and the fibers thus become exposed. The fibers then absorb moisture and serve as wicks, thus providing multiple paths for corrosive fluids to penetrate into the structure. This causes a reduction in the physical and mechanical properties of the article.

It has been reported in the literature that the deterioration in properties in fiber reinforced plastic laminates can be substantially reduced by the use of surfacing veils such as glass surfacing mat, dacron, orlon, dynel or nylon. The surfacing veil keeps the laminate reinforcing strands away from the mold surface and helps provide a more resin-rich surface on the molded object. This surface is more resistant to corrosion.

A veiled laminate is illustrated on page 389 of *Reinforced Plastics*, December 1977. It is stated therein that the most reliable laminate construction for corrosion resistance is the illustrated one, the most important feature of which is the primary corrosion barrier which is rich in resin and is reinforced with "C" glass veil followed by two layers of chopped strand mat. The remaining part of the laminate is built up with appropriate layers of reinforcement required to meet mechanical performance specification and may include, for example, alternate layers of woven rovings and chopped strand mat or continuously wound glass filaments. It is further stated that a resin rich outside surface should be included in situations where spillage may occur or where the exterior environment is also corrosive.

Various ways to form a gel coat over the surface of a structure made from fiber reinforced plastic to prevent the exposure of the fiber to the environment are known in the art. Two such prior art techniques are known as "hand layup process" and "wet mat molding process".

The hand layup process involves the use of a preform outlining the contour of the article to be formed. A layer of a thermosetting resin, such as an epoxy resin or polyester resin, and fiberglass are applied to the work surface of the mold. Squeeges or rollers can be used to work in the reinforcement and remove air. For the necessary thickness, additional layers can be added. The layup can be cured at room temperature or accelerated by oven curing. For high quality surfaces, the mold surface can be sprayed with a gel coat prior to the layup. Other techniques such as vacuum bag, pressure bag, etc. can be used instead of manual layup to smooth the resin-fiber layers and eliminate air. U.S. Pat. Nos. 3,245,865 and 3,257,266 disclose hand layup processes.

The wet mat process is a matched die molding process and involves the formation of an article or composite utilizing matching male and female dies for forming and curing a mat, fabric, or preform into the contour of the finished part. The reinforcement is combined with catalyzed resin at the press prior to or just after placing in the mold. This operation is usually conducted at temperatures of 225°–350° F., pressures of 100–3000 psi. etc., high enough to cure the thermosetting resin component of the mix. For example, a glass mat is cut to the approximate size of the die and is placed onto the die surface either before or after impregnation with a thermosetting resin. A thermosetting or thermoplastic resin sheet cut to the proper size is then placed over the impregnated glass mat. The composite is then pressed between the male and female dies to the contour of the desired article. In this system, the molding operation utilizes relatively low pressures, e.g., up to about 3 k.s.i., and very little, if any, material flow occurs. U.S. Pat. Nos. 3,454,421; 3,616,185; and 3,679,510 disclose wet mat processes.

The March 1976 issue of *Plastics Technology*, page 41, states that corrosion resistance has been obtained in a variety of SMC (sheet molding compound) parts for sewage-treatment plants and sewer manholes, this being an improvement over the filament winding and hand preforming or layup process traditionally dominant in this field. It is stated that this is accomplished by incorporating a synthetic-fiber surfacing veil to protect the chopped glass from chemical exposure and possible wicking effects; that the fabric or veil is run on one side of the SMC, either under the doctor blade or deposited further downstream, with normal resin paste and chopped glass placed either above or below the cloth. A charge of this material is placed in the mold veil-side down with regular SMC above it to make up the total charge weight. This reference does not disclose the properties which the fabric or veil must possess in order to be satisfactory. The properties of the veil are, however, quite critical in order to obtain the desired results during the molding operation.

SUMMARY OF THE INVENTION

In accordance with one embodiment of the present invention, a composite is formed by spreading a liquid thermosetting resin over a continuously moving plastic film or sheet. Reinforcing fiber is added and a fabric or veil, such as a dacron polyester cloth, is continuously laid over the top to form a reinforced composite. This continuously produced thermosetting resin composite is rolled into a coil. After a maturation period, the plastic film or sheet may be removed from the SMC composite and sections of appropriate size and weight are cut from the coil and placed over the die of a compression molding machine, veil side down, up or both. The material is then compression molded at a pressure of 500–3000 p.s.i. (35 to 210 kg. per sq. cm.) and a temperature of 100°–165° C., and cured into an article.

Alternatively, in accordance with another embodiment of this invention, the fabric or veil may be first placed on one of the die elements, e.g., the female die.

SMC is then placed over the fabric to make up the total charge. The charge is then compression molded under the conditions previously described.

The properties of the veil or fabric used with the SMC are critical. During compression molding, resin with which the veil or fabric has been preimpregnated and/or thermosetting resin from the SMC layer is liquified by heat generated during the molding and is caused to flow through the fabric, creating a barrier or resin-rich layer on the other side of the fabric. Thus, during the molding operation, the fabric material holds the reinforcing fibers internal to the composite while allowing the resin to pass therethrough to be deposited at the surface of the composite article formed. Since considerable SMC resin flow occurs which exerts considerable lateral force or back pressure on the fabric during the molding operation, it is necessary that the fabric possess certain critical properties. Thus, the fabric must possess a grab break strength of at least 10 pounds per inch in both longitudinal and transverse directions (grab break strength being defined as the total force required per unit of width to tear the fabric sample, see ASTM 1682), a tensile elongation of at least 10% and it must be sufficiently permeable to permit the liquid resin to pass outwardly through the veil during the molding process. If the fabric does not possess these properties, the fabric is liable to tear during the molding operation. The fabric or veil may be, for example, nylon, fiberglass, dacron, or other thermoplastic material. Examples of some commercial fabrics which are suitable for use in accordance with the practice of this invention are Nexus 8022 and Nexus 8023 sold by Burlington Industries; spun bonded nylon fabric sold by Monsanto Chemical; nonwoven, bonded, continuous filament fiberglass mat sold by Riechold Chemical; and woven fiberglass mat.

EMBODIMENTS

The thermosetting SMC with which the fabric is comolded may be a polyester resin, an epoxy resin, a phenolic resin, a polyurethane, an acrylic resin, a vinyl resin, etc. Polyester resins are preferred.

Thermosetting polyester resin compositions are well known in the art and include an ethylenically unsaturated polyester and at least one addition-polymerizable ethylenically unsaturated organic monomer. Ethylenically unsaturated polyesters are prepared by condensing under polymerizing conditions an ethylenically unsaturated dicarboxylic acid or anhydride with a dihydric alcohol. Ethylenically unsaturated dicarboxylic acids include fumaric acid, maleic acid, maleic anhydride, citraconic acid, mesaconic acid, and itaconic acid. The polyester may also contain dicarboxylic acid moieties containing no ethylenic unsaturation such as phthalic acid, phthalic anhydride, adipic acid, sebacic acid, isophthalic acid, terephthalic acid, etc. Dihydric alcohols include ethylene glycol, propylene glycol, diethylene glycol and dipropylene glycol. Styrene is the most common example of an addition-polymerizable ethylenically unsaturated organic monomer which is copolymerizable with the polyester although other vinyl monomers may also be employed such as diallyl phthalate, methyl methacrylate, vinyl toluene, vinyl acetate, acrylonitrile, etc. A mixture of vinyl monomers may be employed in the thermosetting polyester composition.

Among the reinforcing fibers used in the thermosetting SMC, there can be mentioned glass fibers, e.g., fiber filaments, glass mats, glass cloth and woven roving; asbestos fibers, nylon fibers, metal fibers, sisal, carbon fibers, polypropylene and aramid fibers. The fibers may be chopped or continuous or both. When continuous fibers are employed, they are preferably axially aligned in the layer of SMC.

Fillers such as pigments, clay, etc. may be incorporated into the thermosetting SMC as well as polymerization catalysts such as benzoyl peroxide, t-butyl peroxide, methyl ethyl ketone peroxide, etc.

A typical SMC formulation which may be used in the practice of this invention is set forth below:

| Ingredients | Parts by Weight |
|---|---|
| Unsaturated cross linkable polyester solution in styrene containing 40 parts styrene and 60 parts of a polyester formed by reacting isophthalic acid, maleic anhydride and propylene glycol in a mole ratio of 1:1:2.2 to which is added 200 ppm hydroquinone inhibitor. | 25.3 |
| Tertiary butyl per-benzoate (catalyst) | .4 |
| Zinc stearate (mold release) | .8 |
| Clay filler | 45.3 |
| Pigment | 1.2 |
| Styrene monomer | 1.0 |
| Magnesium hydroxide thickener | 1.0 |
| Chopped glass roving (1") | 25.0 |

In accordance with this invention, corrosion resistant flat sheets may be obtained or molded objects such as chair backs, seats, bathtubs, manhole segments, etc. In the production of flat sheets, the veil need only have the properties previously discussed. However, when molding an article in which a die contains deep crevices, such as a plastic manhole segment as described in pending application Ser. No. 717,506, filed Aug. 24, 1976, now U.S. Pat. No. 4,089,139, the disclosure of which is incorporated herein by reference, it is necessary that the fabric have greater elongation properties. When loading the press to make such a structure, the fabric is first placed on the bottom die and then the fabric is covered with the SMC charge. During the closing of the dies, the SMC and fabric are forced down into the deep crevices to form the ribs. Under such conditions, the fabric should have an elongation in excess of 100% in the direction in which it is to be stretched during the molding operation.

In accordance with the practice of this invention, articles may be made from SMC which are both abrasion resistant and corrosion resistant. By the co-molding of the fabric to the working surface or surfaces of the molded article, a resin-rich veil results which prevents the corrosive media from attacking the fiber reinforcement in the SMC resulting in retention of strength. Similarly, such a veil reduces the surface wear where abrasion is a factor. For example, chair backs and seats are commonly made from SMC. However, they become unsightly as the surface wears away and the reinforcement fibers become exposed. The practice of this invention prevents this. Similarly, in a manhole application, loss of strength by corrosive attack of sewage is a consideration and, in a bathtub, consideration is given to loss of strength and appearance by corrosive and abrasive attacks of cleansers, which attacks are prevented by this invention.

DESCRIPTION OF THE DRAWINGS

The invention will now be more fully described by reference to the accompanying drawings wherein:

FIG. 1 illustrates a conventional process for making SMC. A low viscosity thermosetting resin from a source not shown is metered onto a carrier sheet 10 by means of a doctor blade 11. The sheet 10 may be polyethylene, polypropylene, etc. The coated sheet is carried at a controlled rate on a belt 12. Glass fibers 13 are fed through a chopper 14 to deposit a controlled and uniform layer of chopped filaments 15 onto the resin paste film. Optionally, axially aligned continuous filaments may be deposited onto the resin paste film from a source not shown as described in U.S. Pat. No. 4,141,929, the disclosure of which is incorporated herein by reference. A second sheet 16, which may be the same composition as sheet 10, has a film of low viscosity thermosetting resin from a source not shown applied by doctor blade 17, and the coated sheet is continuously placed in contact with the layer of chopped filaments, the resin coated side of the sheet being in contact with the layer of chopped filaments. There is thus obtained a sandwich construction, the layers of the sandwich being as follows: carrier sheet, thermosetting resin, chopped glass fibers, thermosetting resin, carrier sheet. This sandwich construction is then carried through squeeze rollers 18 for compaction and complete wetting and/or coating of the chopped filaments 15. The SMC sandwich can then be coiled onto roll 19. It is then stored for the required maturation time to partially cure the resin in order to achieve the required viscosity. Over a period of several hours, the resin reverts to a dry or slightly tacky state without further processing. After aging, the sheets 10 and 16 are removed. The SMC can then be cut into segments ready for charging into a compression molding machine.

FIG. 2 illustrates one embodiment of this invention. A fabric 20 having the critical properties previously discussed is cut to a size at least as large as the die with which it is to be used. The fabric 20 is positioned over the male die 21. A conventional SMC segment 22 is placed on top of the fabric 20. The female die 23 is then closed to form the molded article. During the molding operation, resin with which the fabric has been preimpregnated and/or thermosetting resin from the SMC is liquified by heat generated during the molding and is caused to flow through the fabric, creating a barrier or resin-rich layer on the side of the fabric facing the mold 21.

FIG. 3 illustrates the preparation of a composite useful in another embodiment of this invention. In accordance with this embodiment, the fabric is incorporated into the sandwich to form a composite. The SMC sandwich is formed as previously described with respect to FIG. 1 except that fabric 30 having the critical properties previously discussed, is placed on top of the sheet 16 before application of the synthetic resin by doctor blade 17. There is thus obtained a sandwich construction having the following layers: carrier sheet, thermosetting resin, chopped glass fibers, thermosetting resin, fabric, carrier sheet. After going through squeeze rollers 18, the finished sandwich construction may be taken up on a roll as shown in FIG. 1 or boxed as shown in FIG. 3 in box 31 for the required maturation period. After maturation, the sheets 10 and 16 are stripped away. The finished composite is then cut into segments.

Referring to FIG. 4, the segment 31 comprises a fabric layer 30 and the SMC layer 32 composed of chopped glass filaments impregnated with thermosetting resin. As shown in FIG. 5, the segment 31 is then placed on the male die 21. When the female die is closed to form the molded object, there is created a resin-rich layer on the side of the fabric facing the male die.

FIG. 6 shows an alternative embodiment in which fabric 20 is placed both above and beneath the SMC segment 22 so that the final molded object will have a resin rich layer on both the top and the bottom surfaces thereof. Similarly, a second fabric 30 may be added to the other side of the composite described with respect to FIG. 3 in which case it would be added ahead of the doctor blade 11.

Figure 1:
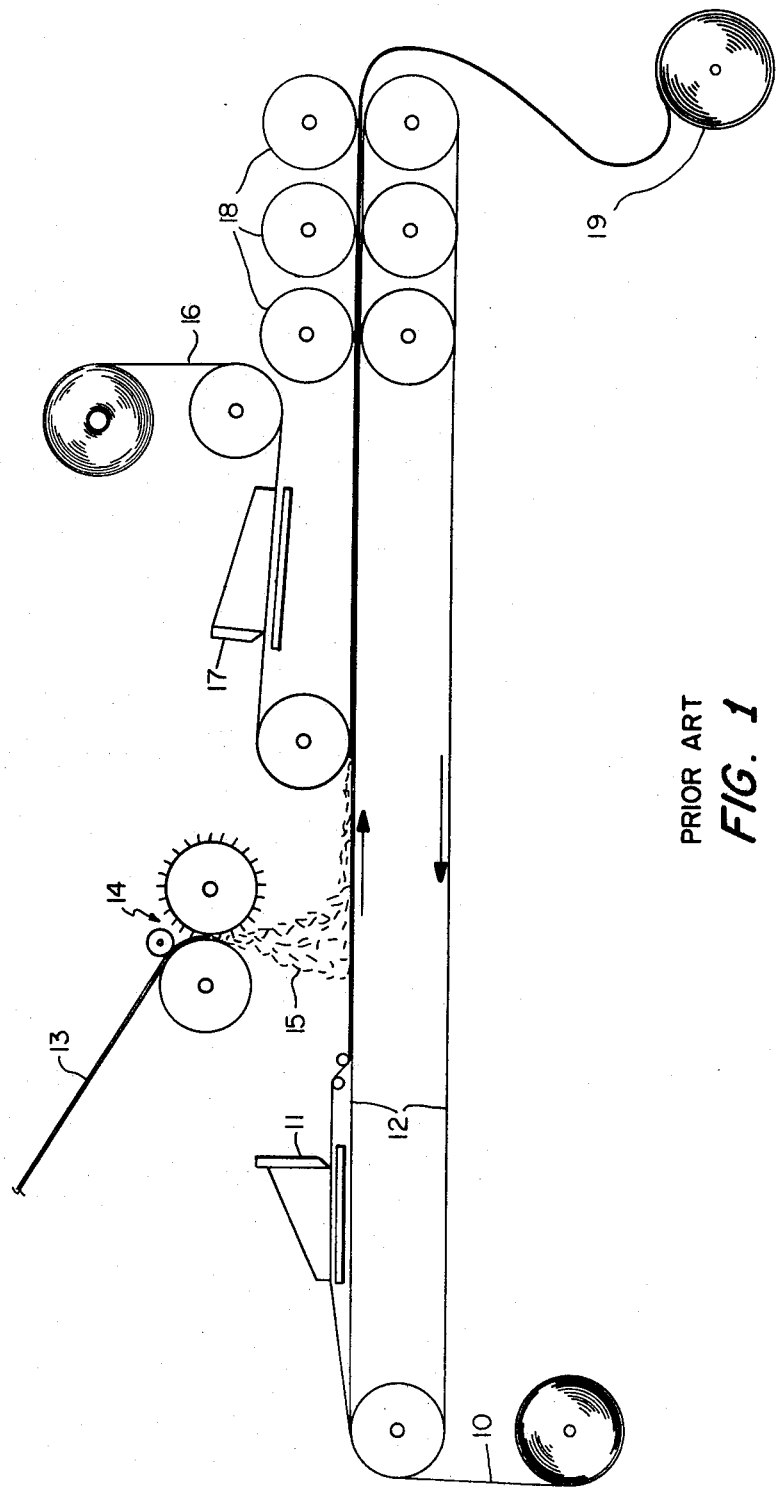
FIG. 1 is a schematic side view of an apparatus for making SMC by a conventional process.
Figure 2:
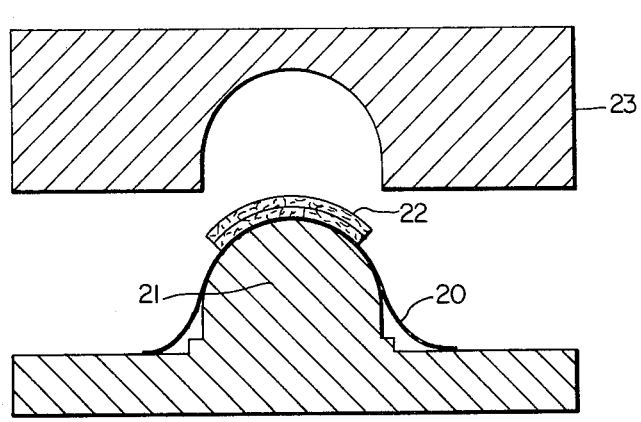
FIGS. 2, 5, 6 and 7 are cross-sectional views of a molding apparatus illustrating embodiments of this invention.
Figure 5:
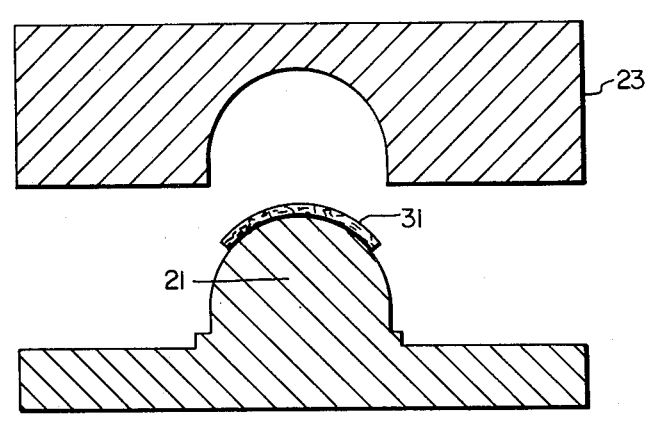
Figure 6:
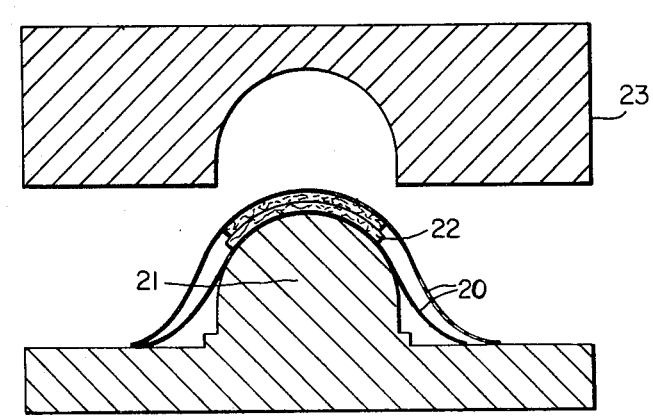
Figure 7:
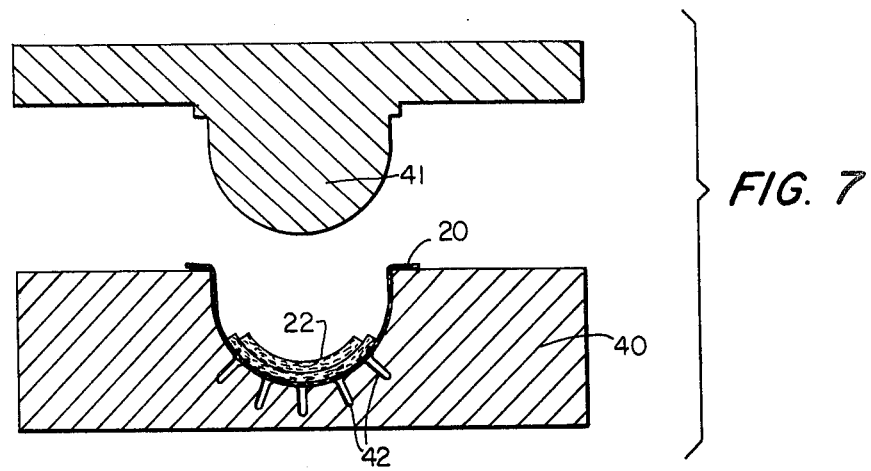

If a fabric is only required on one side of the composite such as in FIGS. 2 and 5, the fabric is preferably in contact with the bottom die, with the SMC formulation being positioned above the fabric. In the embodiment shown in FIGS. 2 and 5, the resin-rich layer will be on the inside of the molded object. If it is required that the resin rich layer be on the outside of the molded object, the die positions are reversed as shown in FIG. 7 in which the female die 40 is the bottom die and the male die 41 is the top die. A fabric 20 having the critical properties previously discussed is positioned to cover the inner surface of female die 40. A segment of composite 22 is place on top of the fabric on the female die 40.

Referring again to FIG. 7, there are shown cavities 42 in the female mold 40. During the molding operation, pressure forces the SMC and fabric into the cavities 42. This causes considerable force to be exerted against the fabric which is the primary reason why the critical properties previously mentioned are essential for the fabric. It will be appreciated to those skilled in the art that where, as in the case of a manhole segment illustrated in FIG. 10, the ribs are on the interior rather than the exterior of the molded object, similar cavities would be positioned in the male die.

The following examples illustrate the practice of this invention:

EXAMPLE 1

Figure 3:
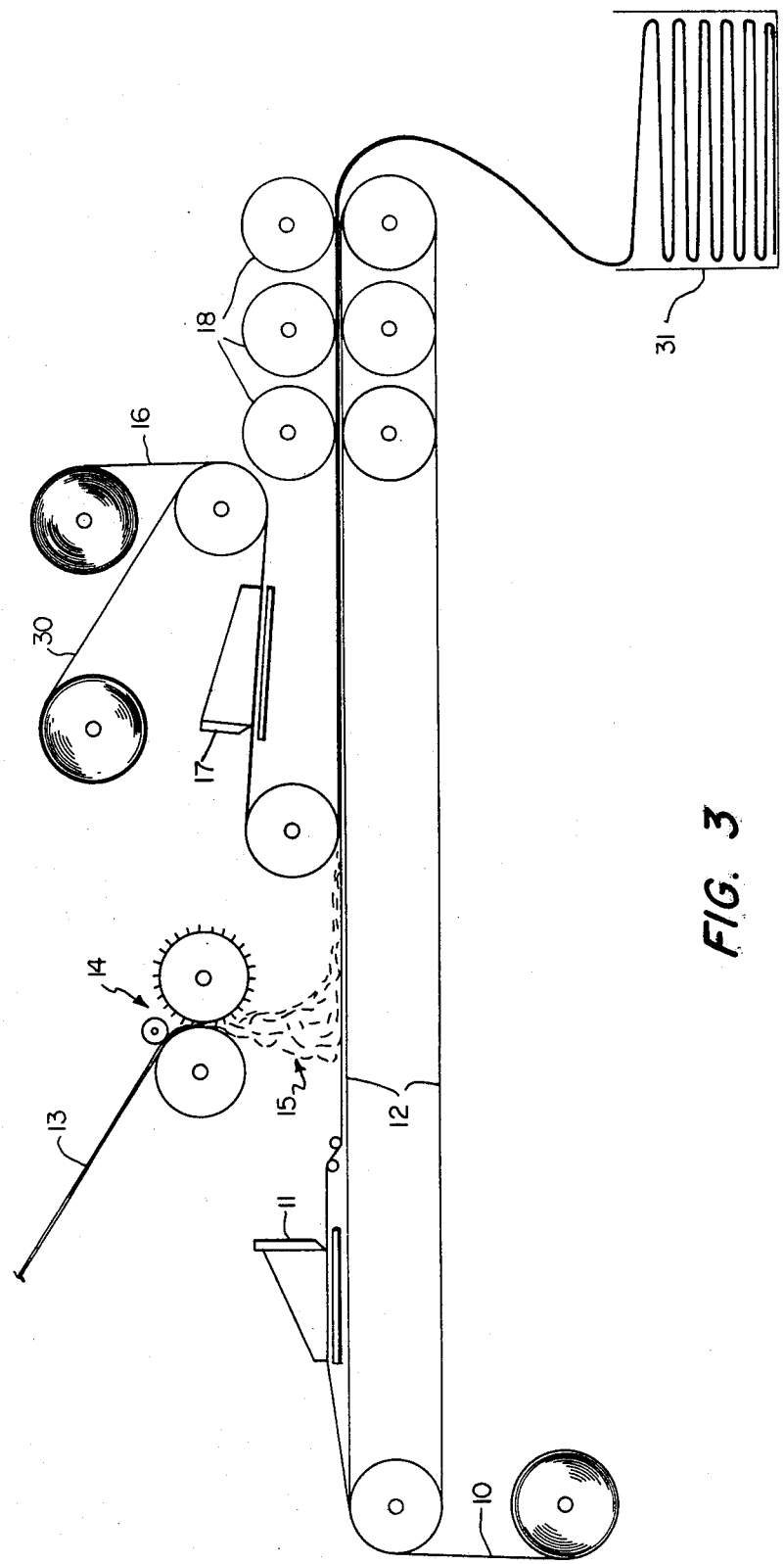
FIG. 3 is a schematic side view of an apparatus for preparing an SMC-fabric composite.
Figure 4:
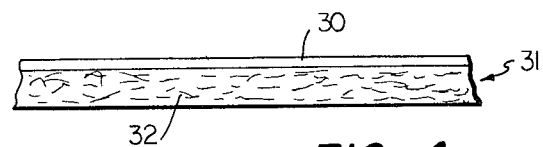
FIG. 4 is a cross-sectional view of a fragment of SMC-fabric composite.

A segment of an SMC-fabric composite such as shown in FIG. 4 and prepared as described above with respect to FIG. 3, is placed in a flat sheet mold. The thermosetting resin in the SMC is polyester. The fabric is sold by Burlington Industries under the trade name Nexus. The composite is molded at a pressure of 1000 psi, and a temperature of 265°–275° F. for 2 to 3 minutes. The molded sheet having a resin rich layer on one side thereof is 8¼-inches by 11-inches by ½-inch.

EXAMPLE 2

Figures 8, 9:
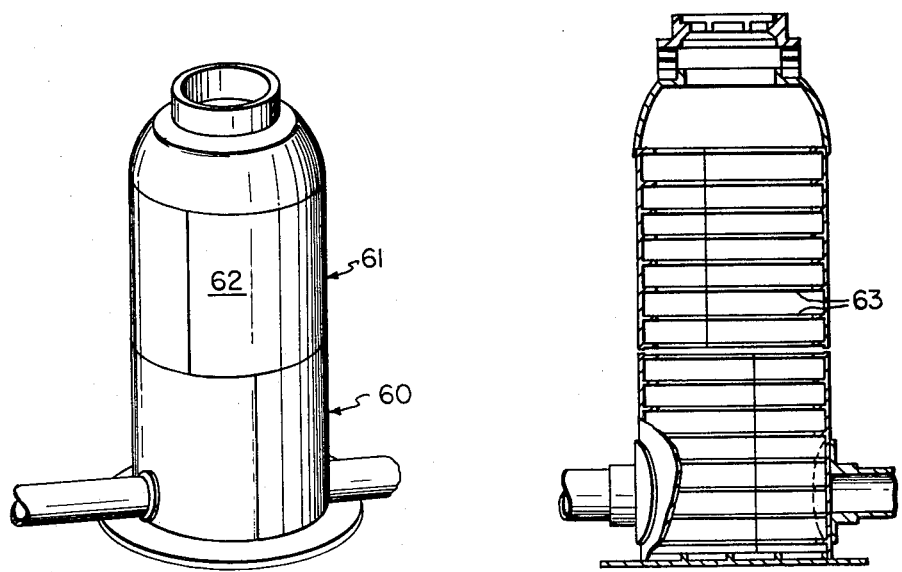
FIG. 8 is a perspective view of a manhole comprised of segments produced in accordance with the practice of this invention.
FIG. 9 is a cross-section of the manhole shown in FIG. 8.
Figure 10:
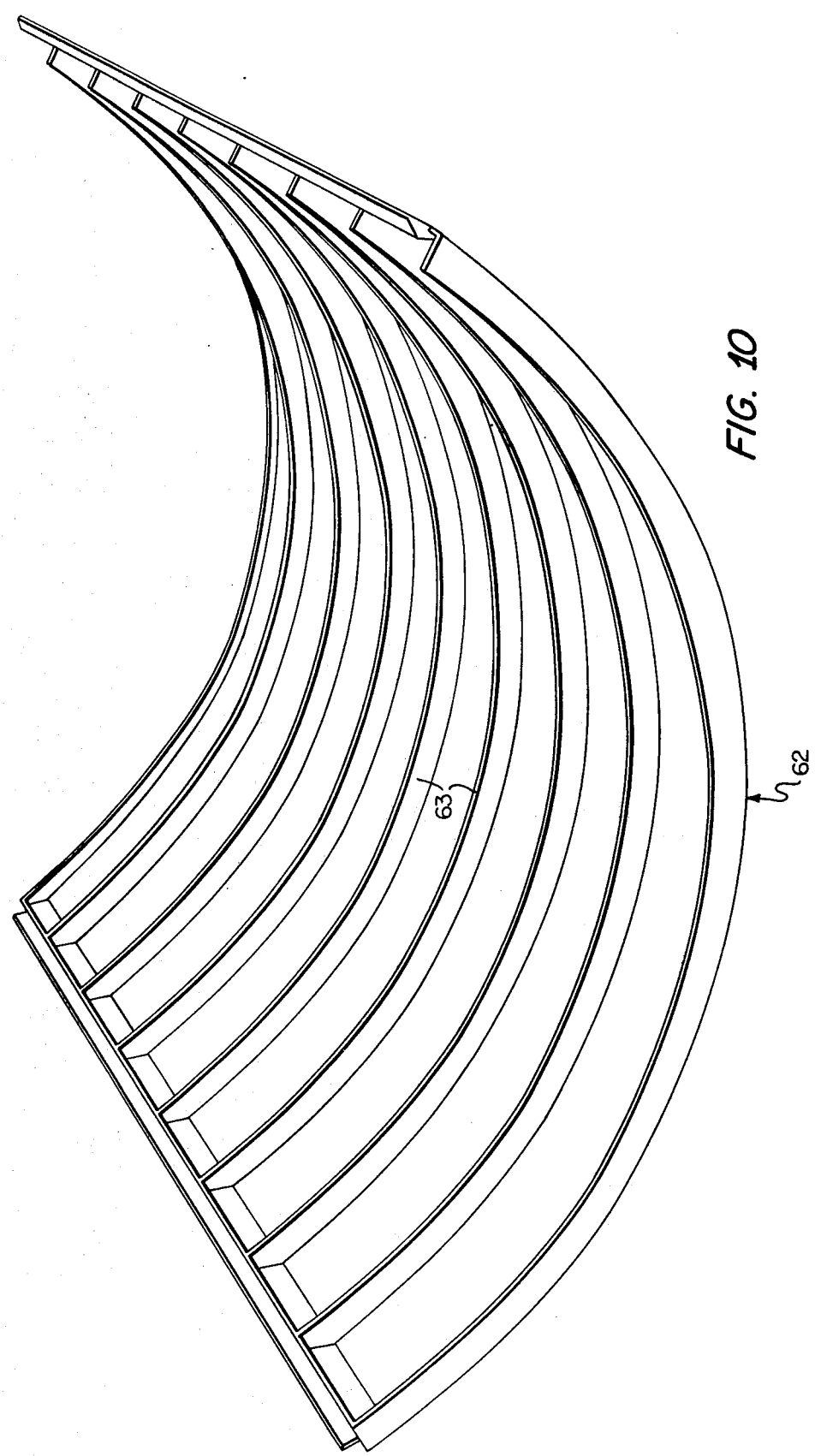
FIG. 10 is a perspective view of one segment used in the construction of the manhole shown in FIG. 8.

This example illustrates the molding of an object containing structural ribs by the process described with respect to FIG. 2. The molded article prepared in this example is a plastic manhole segment as described in previously mentioned U.S. Pat. application Ser. No. 717,506, filed Aug. 24, 1976. FIG. 8 shows the manhole as being composed of a number of tiers 60 and 61. Each tier consists of a plurality of segments 62. FIG. 9 is a cross-section of the manhole showing horizontal ribs 63. FIG. 10 is a perspective view of one such segment 62. The mold used to prepare this segment has the male die on the bottom and the female die on the top. The male die contains a number of cavities corresponding to the grooves 63 on the segment 62. A fabric sold under the trade name Nexus 8023 is cut so that it is somewhat larger than the male die and is then placed over the top of the male die. An SMC charge is placed on top of the fabric and during closing of the die, the female die causes the SMC and fabric to be forced down into the deep crevices of the male die to form the ribs. The molding operation is conducted at a pressure of 1000 psi, a temperature of 265° to 275° F. and a time of from 2 to 3 minutes. The extraneous fabric resulting from the piece of fabric initially placed on the male die was larger than that die, is removed by trimming away from the finished composite.

A manhole segment prepared as described in Example 2 is immersed in a 5% $H_2SO_4$ solution for 1, 6 and 12 months, and after each period of immersion, the flexural strength is determined and the percent retention of flexural strength is calculated. Prior to immersion, the flexural strength is determined to be 21,513 psi. Following one month immersion, the flexural strength is determined to be 20,136 psi (93.6% retention); following six months immersion, the flexural strength is determined to be 20,245 psi (94.1% retention); and following 12 months immersion, the flexural strength is determined to be 19,004 psi (88.3% retention). For the purpose of comparison, similar tests are conducted on a standard manhole cover prepared as described in Example 2 with the exception that the fabric is omitted. The flexural strength of this manhole segment prior to immersion is determined to be 24,909 psi; the flexural strength after one month immersion is determined to be 20,766 p.s.i. (83.4% retention); the flexural strength following six months immersion is determined to be 16,161 psi (64.9% retention); and the flexural strength following 12 months immersion is determined to be 12,889 psi (51.7% retention). Thus, the segment prepared in accordance with this invention retained 36.6% more of its original flexural strength following 12 months immersion in 5% $H_2SO_4$ than did a manhole segment prepared without any fabric.

We claim:

1. A reinforced composite suitable for conversion into a finished product by compression molding at temperatures of 100°–165° C. and pressures of 500–3000 p.s.i. (35–210 kg. per sq. cm.) comprising
    a uniform layer of a dry partially cured curable thermosetting polymeric material capable of being liquified by heat including a reinforcing proportion of reinforcing fibers, and
    a fabric overlying at least one surface of said layer, said fabric having a grab break strength of at least 10 lbs. (4.5 kg.) in both longitudinal and transverse directions, and a tensile elongation of at least 10%, said fabric being sufficiently permeable to permit liquid polymeric material to pass therethrough during compression molding.

2. The reinforced composite according to claim 1 wherein the fabric comprises linear polyester fibers.

3. The reinforced composite according to claim 1 wherein the curable polymeric material comprises a polyester resin.

4. The reinforced composite according to claim 1 wherein the reinforcing fibers comprise chopped glass rovings.

5. The reinforced composite according to claim 1 wherein the reinforcing fibers comprise continuous fibers axially aligned in said layer.

* * * * *